United States Patent
Matsuo et al.

(10) Patent No.: US 9,323,050 B2
(45) Date of Patent: Apr. 26, 2016

(54) LIGHT SCANNING DEVICE HAVING REDUCED SIZE AND PARTS COUNT, AND IMAGE FORMING APPARATUS WITH THE SAME

(71) Applicant: Sharp Kabushiki Kaisha, Osaka-shi, Osaka (JP)

(72) Inventors: Manabu Matsuo, Osaka (JP); Nobuhiro Shirai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/433,432

(22) PCT Filed: Oct. 15, 2013

(86) PCT No.: PCT/JP2013/077956
§ 371 (c)(1),
(2) Date: Apr. 3, 2015

(87) PCT Pub. No.: WO2014/061657
PCT Pub. Date: Apr. 24, 2014

(65) Prior Publication Data
US 2015/0268463 A1    Sep. 24, 2015

(30) Foreign Application Priority Data

Oct. 17, 2012    (JP) .................................. 2012-230109

(51) Int. Cl.
| | | |
|---|---|---|
| B41J 2/385 | (2006.01) | |
| G02B 26/08 | (2006.01) | |
| G02B 26/12 | (2006.01) | |
| H04N 1/053 | (2006.01) | |
| H04N 1/113 | (2006.01) | |
| H04N 1/12 | (2006.01) | |
| G03G 15/04 | (2006.01) | |

(52) U.S. Cl.
CPC ............ *G02B 26/123* (2013.01); *G02B 26/122* (2013.01); *G03G 15/04* (2013.01); *G03G 15/0409* (2013.01); *H04N 1/053* (2013.01); *H04N 1/1135* (2013.01); *H04N 1/12* (2013.01); *G03G 15/04072* (2013.01); *G03G 2215/0132* (2013.01); *H04N 2201/0082* (2013.01); *H04N 2201/04713* (2013.01); *H04N 2201/04732* (2013.01); *H04N 2201/04744* (2013.01)

(58) Field of Classification Search
CPC .............................. G02B 26/123; G03G 15/04
USPC ......... 347/230–233, 238, 241–245, 256–261, 347/263, 118
See application file for complete search history.

(56) References Cited

U.S. PATENT DOCUMENTS 7,236,281 B2 *   6/2007   Hayashi et al. ............ 359/204.1
8,154,706 B2 *   4/2012   Kato ............................... 355/67

FOREIGN PATENT DOCUMENTS

| JP | 2006030731 A | * | 2/2006 | ............. G02B 26/10 |
| JP | 2006-154097 A | | 6/2006 | |
| JP | 2013-033129 A | | 2/2013 | |
| JP | 2013-167683 A | | 8/2013 | |

\* cited by examiner

*Primary Examiner* — Manish S Shah
*Assistant Examiner* — Roger W Pisha, II
(74) *Attorney, Agent, or Firm* — Keating & Bennett, LLP

(57) ABSTRACT

Respective first semiconductor lasers 44a and 44b and respective second semiconductor lasers 45a and 45b are arranged on a drive substrate 46 (YZ plane) such that the emission directions of light beams L1 to L4 of the respective first semiconductor lasers 44a and 44b and the respective second semiconductor lasers 45a and 45b are perpendicular to the YZ plane. On the YZ plane, the respective first semiconductor lasers 44a and 44b and the respective second semiconductor lasers 45a and 45b are divided to two mutually different lines y1 and y2 in the lateral direction perpendicular to the rotation axis of a polygonal mirror 42, and the respective first semiconductor lasers 44a and 44b and the respective second semiconductor lasers 45a and 45b are arranged on respective different lines z1 to z4 in the vertical direction as the rotation axis direction of the polygonal mirror 42.

5 Claims, 8 Drawing Sheets

LIGHT SCANNING DEVICE HAVING REDUCED SIZE AND PARTS COUNT, AND IMAGE FORMING APPARATUS WITH THE SAME

TECHNICAL FIELD

The present invention relates to a light scanning device that uses a plurality of light beams to scan respective scan objects and an image forming apparatus with the light scanning device.

BACKGROUND ART

For example, a color image forming apparatus using an electrophotographic image forming method uniformly charges the surfaces of respective photosensitive bodies (respective scan objects) corresponding to a plurality of colors and then scans the respective photosensitive body surfaces with respective light beams so as to form respective electrostatic latent images on the respective photosensitive body surfaces. The color image forming apparatus develops the electrostatic latent images on the respective photosensitive body surfaces using respective colors of toner to form toner images in the respective colors on the respective photosensitive body surfaces. The color image forming apparatus superimposes and transfers the toner images in the respective colors from the respective photosensitive bodies to an intermediate transfer body so as to form a color toner image on the intermediate transfer body, and then transfers this color toner image from the intermediate transfer body to a recording paper sheet.

The respective photosensitive bodies are scanned with the respective light beams by a light scanning device. Typically, four colors, which are black, cyan, magenta, and yellow, of toner are used. Accordingly, it is necessary to scan four photosensitive bodies using at least four light beams, and four light-emitting elements for emitting the four light beams need to be used.

Nowadays, there is a need for downsizing and thinning of the image forming apparatus, and a downsized and thinned light scanning device becomes necessary. Accordingly, there is proposed a light scanning device with the following configuration. A polygonal mirror (deflecting section) is arranged approximately in the center of the light scanning device. Two optical systems are arranged symmetrical with respect to the polygonal mirror at the center. Respective light beams emitted from the respective light-emitting elements are reflected by the polygonal mirror so as to be divided into the respective optical systems. The respective optical systems cause the respective light beams to enter the respective photosensitive bodies.

For example, Patent Literature 1 discloses a light scanning device that includes this configuration. Here, respective two-tiered polygonal mirrors are used. Four LDs (light-emitting elements) are arranged in an arc pattern centered at the respective polygonal mirrors such that respective light beams emitted from the respective light-emitting elements are divided into the respective polygonal mirrors and the respective light beams are reflected by the respective polygonal mirrors.

CITATION LIST

Patent Literature

PATENT LITERATURE 1: Japanese Unexamined Patent Application Publication No. 2006-154097

SUMMARY OF INVENTION

Technical Problem

However, in Patent Literature 1, since the respective two-tiered polygonal mirrors are used, it is difficult to reduce the height of the light scanning device. Additionally, since the respective light-emitting elements are arranged in an arc pattern, wiring boards for the respective light-emitting elements need to be separately disposed so as to increase the parts count.

As illustrated in FIG. 10A, if two light-emitting elements 101 are averaged in the vertical direction, the arrangement space for the respective light-emitting elements 101 in the vertical direction becomes wider so as to increase the high of the light scanning device. As illustrated in FIG. 10B, if the four light-emitting elements 101 are arranged in the lateral direction, the arrangement spaces for the respective light-emitting elements 101 in the lateral direction becomes wider so as to widen the width of the light scanning device. Accordingly, application of any of the arrangements makes it difficult to further downsize the light scanning device.

The present invention has been made to solve the above-described conventional problems, and it is an object of the present invention to provide a light scanning device that ensures further downsizing and an image forming apparatus with that light scanning device.

Solutions to the Problems

To solve the above-described problems, a light scanning device according to the present invention includes a plurality of first light-emitting elements and a plurality of second light-emitting elements, a deflecting section, a first image-forming optical system, and a second image-forming optical system. The deflecting section is configured to deflect respective light beams emitted from the respective first light-emitting elements and the respective second light-emitting elements. The first image-forming optical system is configured to guide the respective light beams emitted from the respective first light-emitting element and deflected by the deflecting section, to respective scan objects. The second image-forming optical system is configured to guide the respective light beams emitted from the respective second light-emitting elements and deflected by the deflecting section, to respective scan objects. The respective first light-emitting elements and the first image-forming optical system, and the respective second light-emitting elements and the second image-forming optical system are divided to both sides of a straight line passing through a rotation axis of the deflecting section. The light scanning device further includes a first incident optical system and a second incident optical system. The first incident optical system is configured to guide the light beams of the respective first light-emitting elements to a first incident spot of the deflecting section through an identical line in a view along a rotation axis direction of the deflecting section. The second incident optical system is configured to guide the light beams of the respective second light-emitting elements to a second incident spot of the deflecting section through another identical line in a view along the rotation axis direction of the deflecting section. The respective first light-emitting elements and the respective second light-emitting elements are arranged on an identical plane such that emission directions of the light beams of the respective first light-emitting elements and the respective second light-emitting elements are perpendicular to the plane. On the plane, the respective first light-emitting elements and the respective second light-emitting elements are divided to two mutually different lines in a lateral direction perpendicular to the rotation axis of the deflecting section, and the respective first light-emitting elements and the respective second light-emitting elements are arranged on the respective different lines in a vertical direction as the rotation axis direction of the deflecting section.

This light scanning device according to the present invention guides the light beams of the respective first light-emitting elements to the first incident spot of the deflecting section through the identical line in a view along the rotation axis direction of the deflecting section, and guides the light beams of the respective second light-emitting elements to the second incident spot of the deflecting section through the other identical line in a view along the rotation axis direction of the deflecting section. This reduces the size of the deflecting section which the respective light beams enter, so as to downsize the light scanning device.

Since the respective first light-emitting elements and the respective second light-emitting elements are arranged on the identical plane, the respective first light-emitting elements and the respective second light-emitting elements can be mounted on the identical substrate so as to reduce the parts count.

Further, the respective first light-emitting elements and the respective second light-emitting elements are divided to the two mutually different lines in the lateral direction, and the respective first light-emitting elements and the respective second light-emitting elements are arranged on the respective different lines in the vertical direction. Accordingly, a line pitch in the lateral direction and a line pitch in the vertical direction can be narrowed so as to downsize the light scanning device.

In the light scanning device according to the present invention, the following configuration is possible. The line pitch in the vertical direction is equal to or shorter than the line pitch in the lateral direction.

In this case, the pitch of the lines in the vertical direction is narrowed so as to reduce the arrangement space for the respective first light-emitting element and the respective second light-emitting element in the vertical direction.

For example, in the light scanning device according to the present invention, the following configurations are possible. The respective first light-emitting elements and the respective second light-emitting elements are arranged at respective corners of a trapezoidal on the plane. Alternatively, the respective first light-emitting elements and the respective second light-emitting elements are arranged at respective corners of a saw-tooth shape on the plane.

On the other hand, an image forming apparatus according to the present invention includes the above-described light scanning devices according to the present invention. The image forming apparatus forms a latent image on a scan object by the light scanning device, develops the latent image on the scan object as a visible image, and transfers and forms the visible image from the scan object to a paper.

This image forming apparatus also provides operations and effects similar to those of the above-described light scanning devices according to the present invention.

Advantageous Effects of Invention

According to the present invention, the configuration guides the light beams of the respective first light-emitting elements to the first incident spot of the deflecting section through the identical line in a view along the rotation axis direction of the deflecting section, and guides the light beams of the respective second light-emitting elements to the second incident spot of the deflecting section through the other identical line in a view along the rotation axis direction of the deflecting section. This reduces the size of the deflecting section which the respective light beams enter, so as to downsize the light scanning device.

Since the respective first light-emitting elements and the respective second light-emitting elements are arranged on the identical plane, the respective first light-emitting elements and the respective second light-emitting elements can be mounted on the identical substrate so as to reduce the parts count.

Further, the respective first light-emitting elements and the respective second light-emitting elements are divided to the two mutually different lines in the lateral direction, and the respective first light-emitting elements and the respective second light-emitting elements are arranged on the respective different lines in the vertical direction. Accordingly, the pitch of the lines in the lateral direction and the pitch of the lines in the vertical direction can be narrowed so as to downsize the light scanning device.

DESCRIPTION OF EMBODIMENTS

Hereinafter, embodiments of the present invention will be described based on the accompanying drawings.

Figure 1:
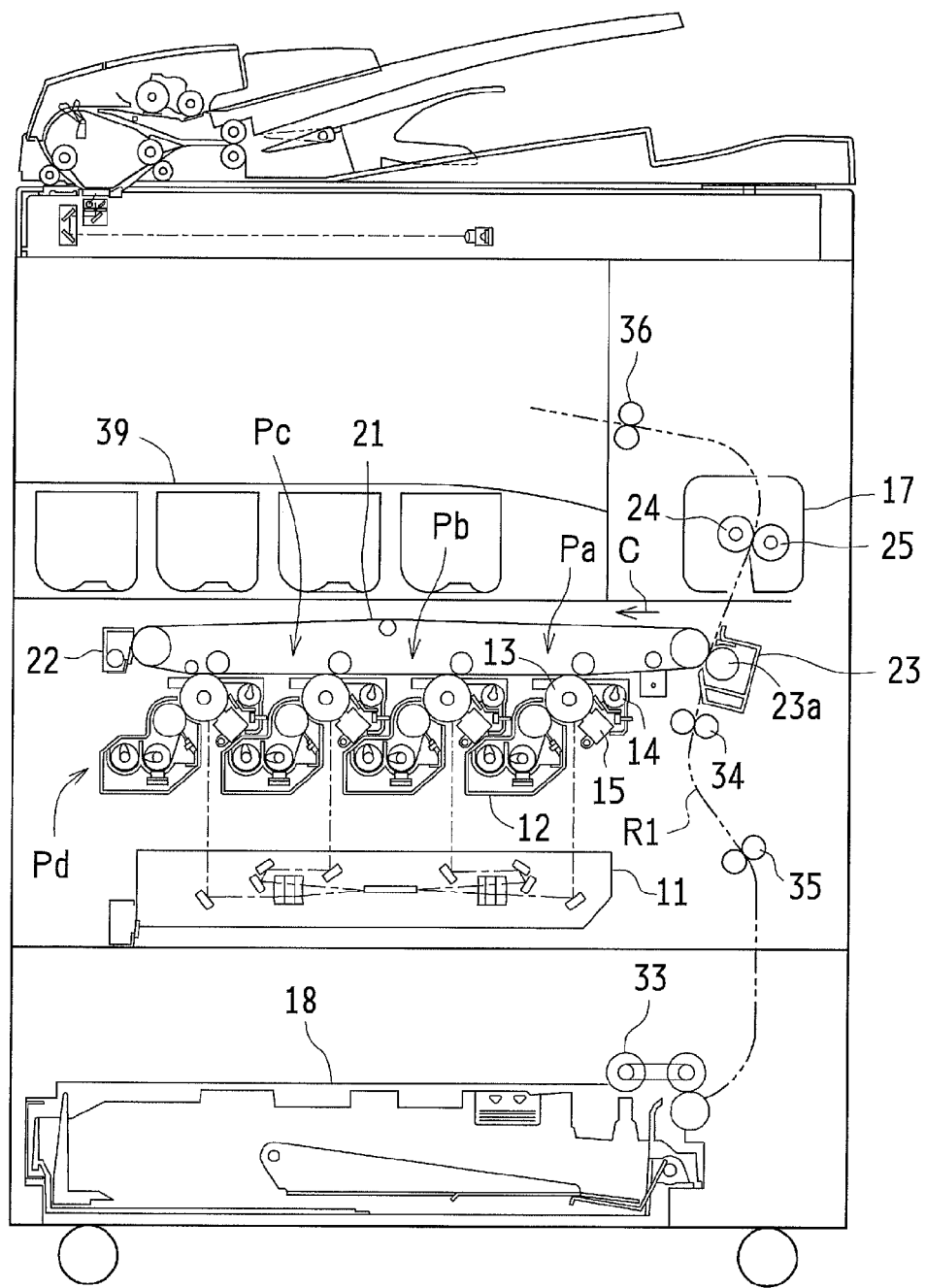
FIG. 1 is a cross-sectional view illustrating an image forming apparatus with a first embodiment of a light scanning device according to the present invention.

FIG. 1 is a cross-sectional view illustrating an image forming apparatus with a first embodiment of a light scanning device according to the present invention. The image data handled by this image forming apparatus 1 corresponds to a color image using respective colors of black (K), cyan (C), magenta (M), and yellow (Y); or corresponds to a monochrome image using a single color (for example, black). In view of this, a development apparatus 12, a photosensitive drum 13, a drum cleaning apparatus 14, a charging unit 15, and a similar apparatus are disposed for each of four to form four types of toner images according to the respective colors. Each apparatus corresponds to black, cyan, magenta, and yellow. Thus, four image stations Pa, Pb, Pc, and Pd are constituted.

The drum cleaning apparatuses 14 remove and recover residual toner at the surfaces of the photosensitive drums 13 of all of the respective image stations Pa, Pb, Pc, and Pd. Then, the charging unit 15 uniformly charges the surfaces of the photosensitive drums 13 at a predetermined electric potential. A light scanning device 11 exposes the surfaces of the photosensitive drums 13 to form electrostatic latent images at the surfaces. Then, the development apparatus 12 develops the electrostatic latent images on the surfaces of the photosensitive drums 13 and form toner images at the surfaces of the photosensitive drums 13. Thus, a toner image with each color is formed at the surface of the photosensitive drum 13.

Subsequently, while an intermediate transfer belt 21 is moved around the arrow direction C, a belt cleaning apparatus 22 removes and recovers residual toner at the intermediate transfer belt 21. Then, toner image with each color at the surface of the photosensitive drum 13 is sequentially transferred and superimposed to the intermediate transfer belt 21, thus a color toner image is formed on the intermediate transfer belt 21.

A nip region is formed between the intermediate transfer belt 21 and a transfer roller 23a of a secondary transfer apparatus 23. The recording paper sheet conveyed through an S-shaped paper sheet transport path R1 is conveyed while being sandwiched by the nip region. The color toner image on the surface of the intermediate transfer belt 21 is transferred on the recording paper sheet. Then, the recording paper sheet is sandwiched between a heating roller 24 and a pressing roller 25 of a fixing apparatus 17, and heated and pressurized for fixing the color toner image on the recording paper sheet.

On the other hand, a pickup roller 33 extracts the recording paper sheets from a sheet feed cassette 18. The recording paper sheets are conveyed through the paper sheet transport path R1, pass through the secondary transfer apparatus 23 and the fixing apparatus 17, and then are carried out to a discharge tray 39 via a discharge roller 36. This paper sheet transport path R1 includes a registration roller 34, a conveyance roller 35, or the discharge roller 36, and a similar part. The registration roller 34 starts conveying the recording paper sheets matching transfer timing of the toner image at the nip region between the intermediate transfer belt 21 and the transfer roller 23a after the recording paper sheets are once stopped and the top of the recording paper sheets are aligned. The conveyance roller 35 promotes conveyance of the recording paper sheets.

Figure 2:
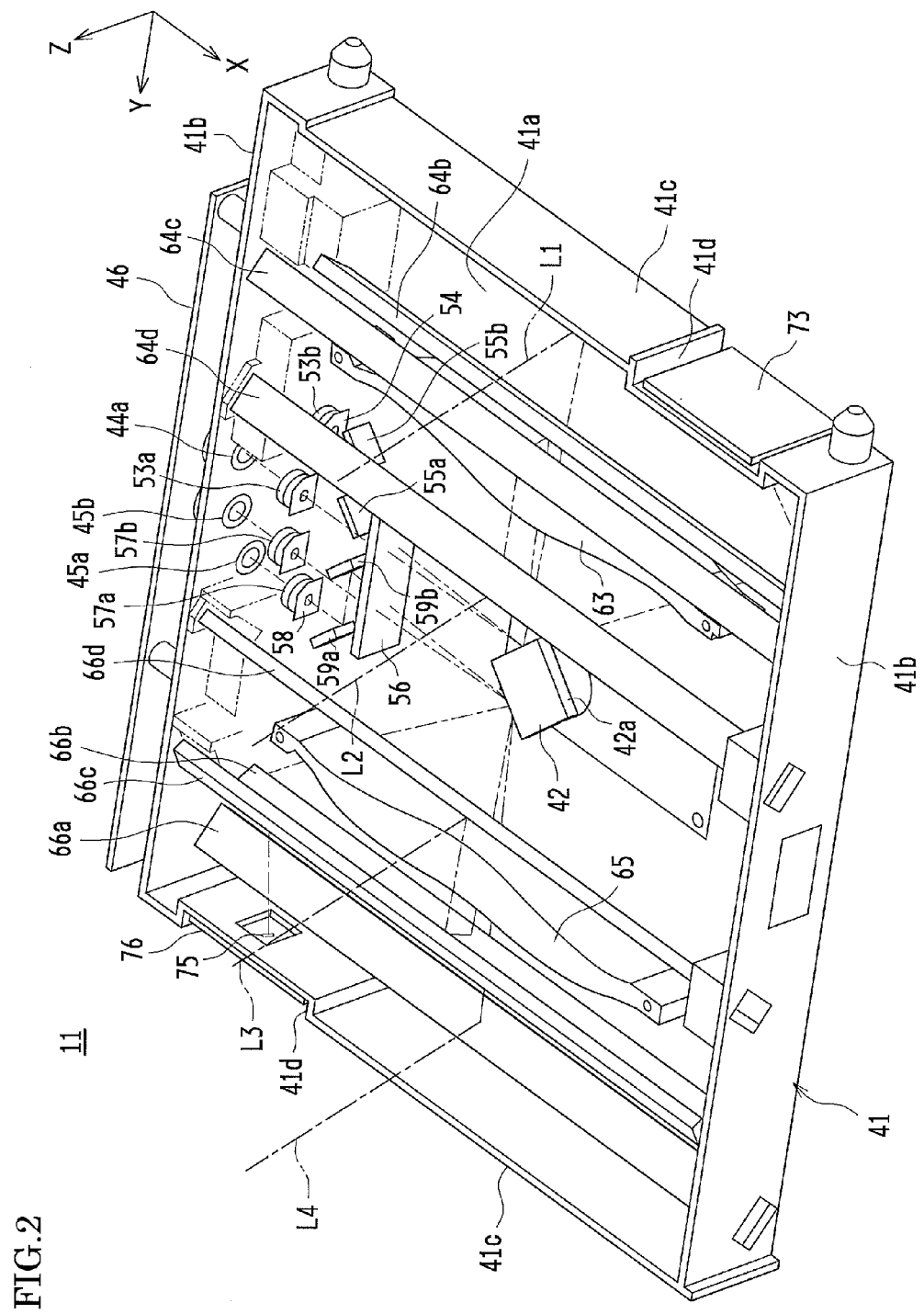
FIG. 2 is a perspective view illustrating an inside of a housing of the light scanning device viewed from obliquely upward and illustrating a state with an upper lid removed.
Figure 3:
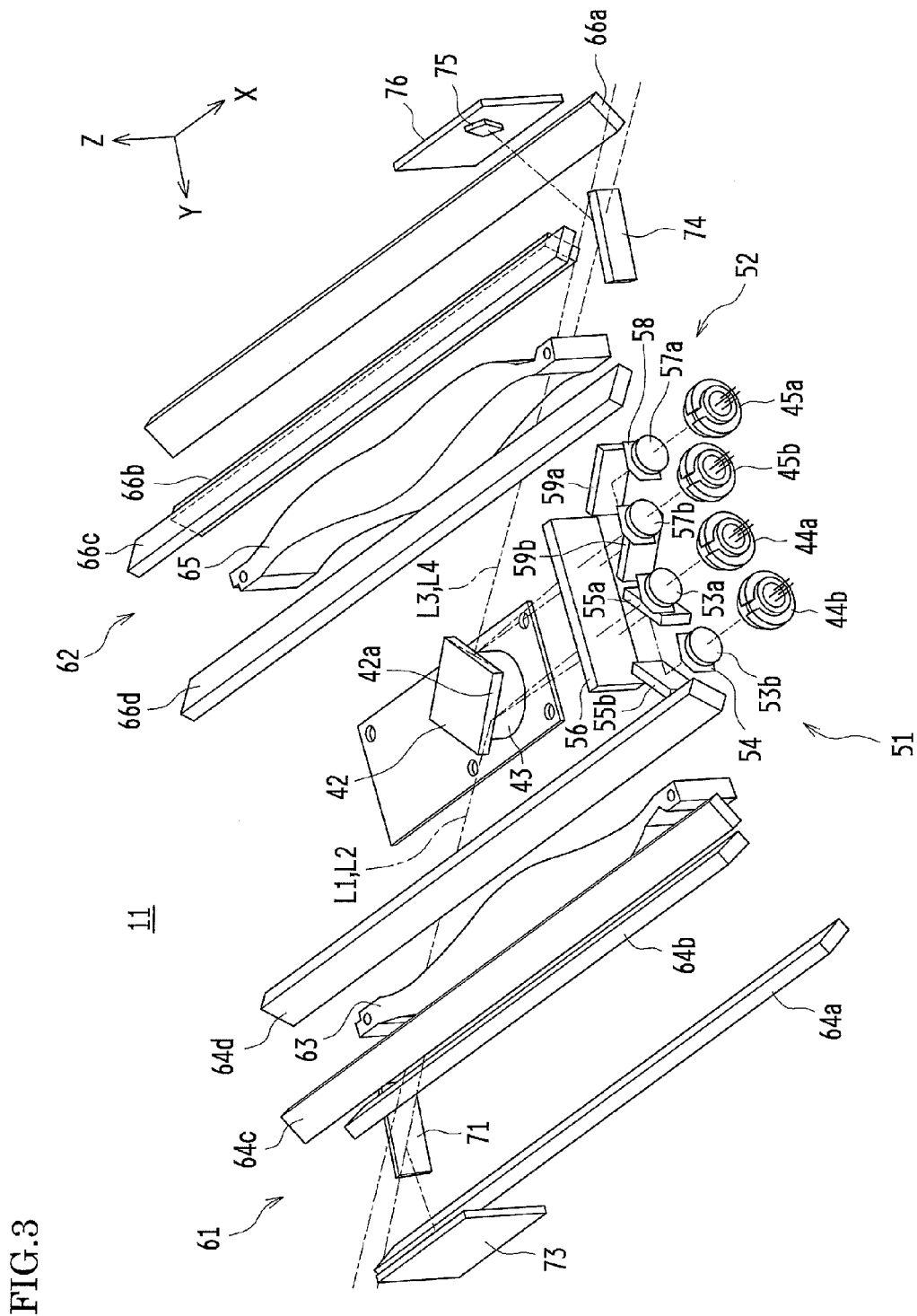
FIG. 3 is a perspective view illustrating a plurality of extracted optical members of the light scanning device and illustrating a state viewed from a back surface side of FIG. 2.
Figure 4:
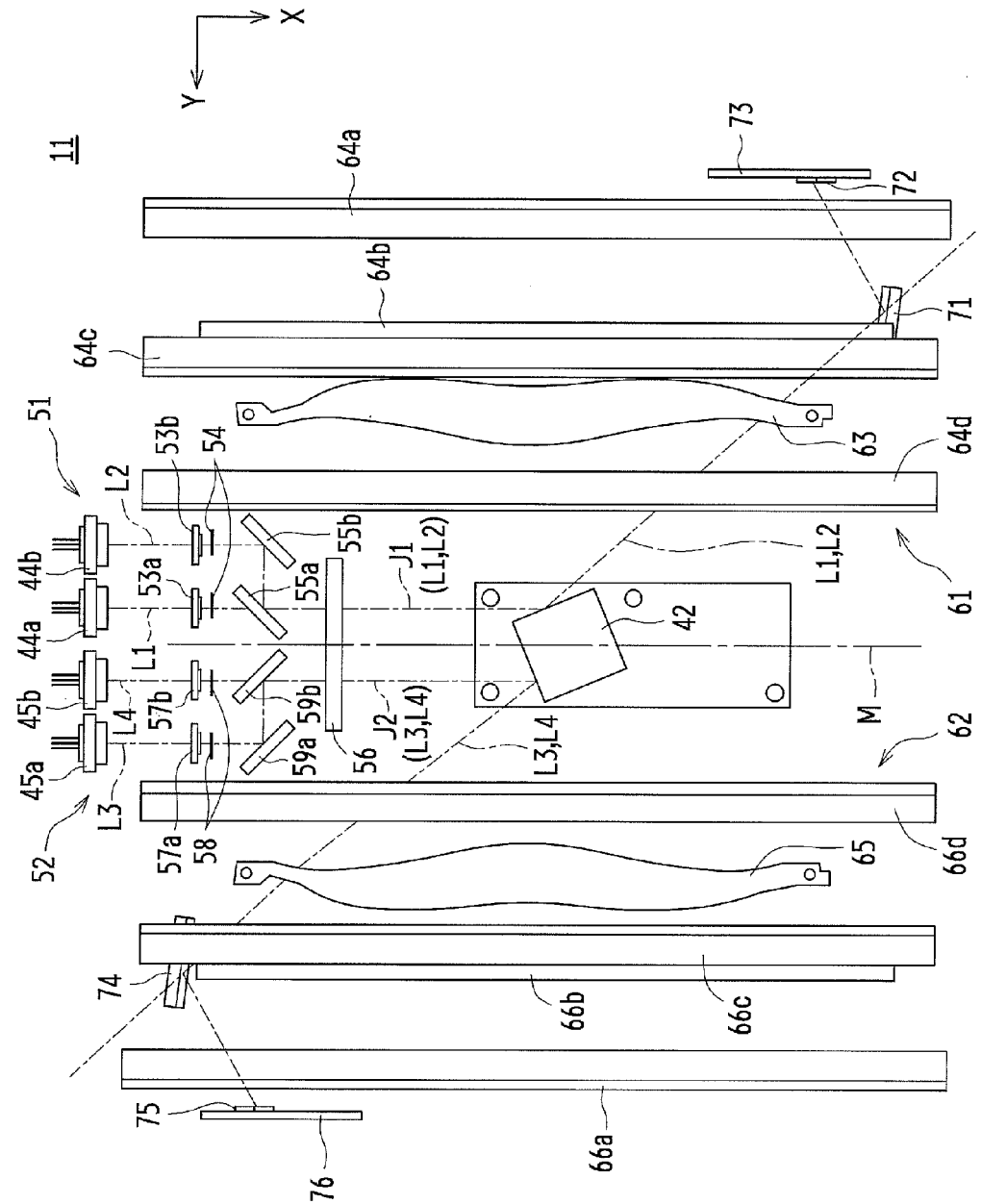
FIG. 4 is a plan view illustrating the plurality of extracted optical members of the light scanning device.
Figure 5:
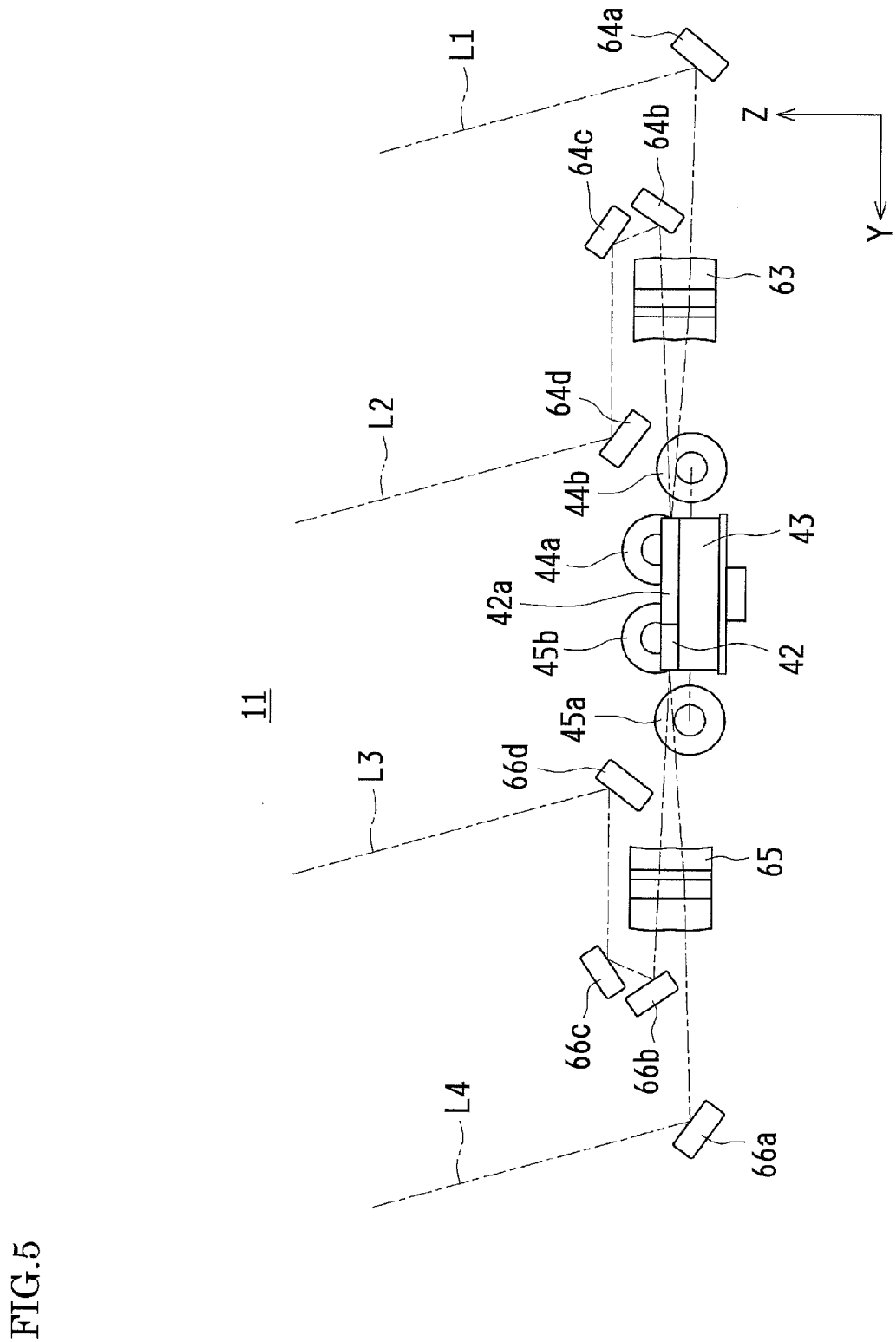
FIG. 5 is a side view illustrating the plurality of extracted optical members of the light scanning device.

Next, the constitution of the light scanning device 11 according to the first embodiment will be described in detail using FIG. 2 to FIG. 5. FIG. 2 is a perspective view illustrating an inside of a housing 41 of the light scanning device 11 of FIG. 1 viewed from obliquely upward and illustrating a state with an upper lid removed. FIG. 3 is a perspective view illustrating a plurality of extracted optical members of the light scanning device 11 and illustrating a state viewed from a back surface side of FIG. 2. Further, FIG. 4 and FIG. 5 are a plan view and a side view illustrating the plurality of extracted optical members of the light scanning device 11.

The housing 41 includes a rectangular bottom plate 41a and four side plates 41b and 41c that surround the bottom plate 41a. A polygonal mirror 42, which has a square shape in plan view, is disposed at approximately center of the bottom plate 41a. A polygonal motor 43 is secured at approximately center of the bottom plate 41a. The center of the polygonal mirror 42 is coupled to and secured to a rotation axis of the polygonal motor 43, and the polygonal motor 43 rotates the polygonal mirror 42.

A drive substrate 46 is secured to the outside of one side plate 41b of the housing 41. The drive substrate 46 includes two first semiconductor lasers 44a and 44b and two second semiconductor lasers 45a and 45b (total of four semiconductor lasers). The respective first semiconductor lasers 44a and 44b and the respective second semiconductor lasers 45a and 45b go into the inside of the housing 41 through respective holes formed at the side plate 41b.

Assuming that an imaginary straight line M extends in a main-scanning direction X passing through the center of the polygonal mirror 42, each of the first semiconductor lasers 44a and 44b is disposed symmetry to the respective second semiconductor lasers 45a and 45b placing the imaginary straight line M as the center. A direction perpendicular to the main-scanning direction X is set as a sub-scanning direction Y. A direction perpendicular to the main-scanning direction X and the sub-scanning direction Y (the longitudinal direction of the rotation axis of the polygonal motor 43) is set as a height direction Z.

The drive substrate 46 is a plane plate-shaped printed circuit board and includes circuits for driving the respective first semiconductor lasers 44a and 44b and the respective second semiconductor lasers 45a and 45b. The respective first semiconductor lasers 44a and 44b and the respective second semiconductor lasers 45a and 45b are disposed on an approximately the same plane (YZ plane) by being mounted on the plane plate-shaped printed circuit board. The first semiconductor lasers 44a and 44b and the second semiconductor lasers 45a and 45b emit light beams L1 to L4, respectively. The respective light beams L1 to L4 are emitted in the vertical direction (the main-scanning direction X) with respect to the plane and to the inside of the housing 41.

On the drive substrate 46 (YZ plane), the respective first semiconductor lasers 44a and 44b are disposed at different positions from one another in the sub-scanning direction Y and the height direction Z. Similarly, the respective second semiconductor lasers 45a and 45b are also disposed different positions from one another in the sub-scanning direction Y and the height direction Z.

The light scanning device 11 includes a first incident optical system 51 and a second incident optical system 52. The first incident optical system 51 guides the light beams L1 and L2 of the respective first semiconductor lasers 44a and 44b to the polygonal mirror 42. The second incident optical system 52 guides the light beams L3 and L4 of the respective second semiconductor lasers 45a and 45b to the polygonal mirror 42. The first incident optical system 51 includes two collimator lenses 53a and 53b, two apertures 54, two mirrors 55a and 55b, a cylindrical lens 56, and a similar component. Similarly, the second incident optical system 52 includes two collimator lenses 57a and 57b, two apertures 58, two mirrors 59a and 59b, the cylindrical lens 56, and a similar component. The respective collimator lens 53a and 53b, the respective apertures 54, and the respective mirrors 55a and 55b of the first incident optical system 51 are disposed symmetrical to the respective collimator lens 57a and 57b, the respective apertures 58, and the respective mirrors 59a and 59b of the second incident optical system 52 placing the imaginary straight line M as the center. The imaginary straight line M passes through the center of the cylindrical lens 56. One half side of the cylindrical lens 56 divided by the imaginary straight line M is disposed at the first incident optical system 51 while the other half side of the cylindrical lens 56 is disposed at the second incident optical system 52.

Further, the light scanning device 11 includes a first image-forming optical system 61 and a second image-forming optical system 62. The first image-forming optical system 61 guides the light beams L1 and L2 of the respective first semiconductor lasers 44*a* and 44*b* reflected by the polygonal mirror 42 to the two photosensitive drums 13 (not illustrated). The second image-forming optical system 62 guides the light beams L3 and L4 of the respective second semiconductor lasers 45*a* and 45*b* reflected by the polygonal mirror 42 to the other two photosensitive drums 13 (not illustrated). The first image-forming optical system 61 is formed of an fθ lens 63, respective four reflective mirrors 64*a*, 64*b*, 64*c*, and 64*d*, and a similar lens. Similarly, the second image-forming optical system 62 is formed of an fθ lens 65, respective four reflective mirrors 66*a*, 66*b*, 66*c*, and 66*d*, and a similar lens. The fθ lens 63 and the respective reflective mirrors 64*a*, 64*b*, 64*c*, and 64*d* of the first image-forming optical system 61 are disposed symmetrical to the fθ lens 65 and the respective reflective mirrors 66*a*, 66*b*, 66*c*, and 66*d* of the second image-forming optical system 62 placing the imaginary straight line M as the center.

A substrate 73 is disposed at the first image-forming optical system 61 side while a substrate 76 is also disposed at the second image-forming optical system 62 side. The substrate 73 includes a BD mirror 71 and a BD sensor 72. The substrate 76 includes a BD mirror 74 and a BD sensor 75. The BD mirror 71 and the BD sensor 72 at the first image-forming optical system 61 side are disposed symmetrical to the BD mirror 74 and the BD sensor 75 at the second image-forming optical system 62 side placing the rotation axis of the polygonal mirror 42 as the center.

Next, optical paths for the light beams L1 and L2 of the respective first semiconductor lasers 44*a* and 44*b* to enter the respective photosensitive drums 13, and optical paths for the light beams L3 and L4 of the respective second semiconductor lasers 45*a* and 45*b* to enter the respective photosensitive drums 13 will be described.

The light beam L1 of the first semiconductor laser 44*a* transmits the collimator lens 53*a* and is made to parallel light. The light beam L1 enters a reflecting surface 42*a* of the polygonal mirror 42 via the aperture 54, the mirror (semi-transparent mirror) 55*a*, and the cylindrical lens 56. The light beam L2 of the first semiconductor laser 44*b* transmits the collimator lens 53*b* and is made to parallel light. The light beam L2 enters and is reflected by the respective mirrors 55*a* and 55*b* via the aperture 54, and enters the reflecting surface 42*a* of the polygonal mirror 42, via the cylindrical lens 56. The cylindrical lens 56 condenses the respective light beams L1 and L2 so as to almost converge the respective light beams L1 and L2 at the reflecting surface 42*a* of the polygonal mirror 42 only in the height direction Z.

Here, on the drive substrate 46 (YZ plane), the respective first semiconductor lasers 44*a* and 44*b* are disposed at different positions from one another in the sub-scanning direction Y. However, the light beam L2 of the first semiconductor laser 44*b* is reflected by the respective mirrors 55*a* and 55*b* to be shifted to a first optical path J1 in common with the light beam L1 of the first semiconductor laser 44*a* in the sub-scanning direction Y. The first optical path J1 is the optical path formed by the first incident optical system 51 from the mirror 55*a* to the reflecting surface 42*a* of the polygonal mirror 42 via the cylindrical lens 56. In this first optical path J1, as illustrated in FIG. 4, the respective light beams L1 and L2 overlap with each other and pass through the identical straight line in plan view (in a view along the rotation axis direction of the polygonal mirror 42). That is, the respective light beams L1 and L2 overlap with each other in the height direction Z.

On the drive substrate 46 (the YZ plane), the respective first semiconductor lasers 44*a* and 44*b* are disposed at different positions from one another in the height direction Z. However, setting of the emission directions of the light beams L1 and L2 of the respective first semiconductor lasers 44*a* and 44*b* or the orientations of the respective mirrors 55*a* and 55*b* almost superimposes incident spots (first incident spots) of the respective light beams L1 and L2 on the reflecting surface 42*a* of the polygonal mirror 42. In view of this, in the first optical path J1, the light beams L1 and L2 of the respective first semiconductor lasers 44*a* and 44*b* enter from obliquely upward and obliquely downward to the reflecting surface 42*a* of the polygonal mirror 42. Then, the respective light beams L1 and L2 reflected by the reflecting surface 42*a* of the polygonal mirror 42 are away from one another in the obliquely downward direction and the obliquely upward direction. The light beam L1 at one side is reflected by the reflecting surface 42*a* of the polygonal mirror 42 to obliquely downward, transmits the fθ lens 63, is reflected by the one mirror 64*a*, and enters the photosensitive drum 13 (not illustrated) where yellow toner image is to be formed. The light beam L2 at the other side is reflected by the reflecting surface 42*a* of the polygonal mirror 42 to obliquely upward, transmits the fθ lens 63, is sequentially reflected by the three mirrors 64*b*, 64*c*, and 64*d*, and enters the photosensitive drum 13 (not illustrated) where a magenta toner image is to be formed.

The polygonal motor 43 rotates the polygonal mirror 42 at equal angular velocity. Then, the polygonal mirror 42 sequentially reflects the respective light beams L1 and L2 at the respective reflecting surfaces 42*a*, and causes the respective light beams L1 and L2 to be repeatedly deflected at the equal angular velocity in the main-scanning direction X. The fθ lens 63 condenses and emits the respective light beams L1 and L2 in both the main-scanning direction X and the sub-scanning direction Y such that the respective light beams L1 and L2 may have a predetermined beam diameter at the surface of the respective photosensitive drums 13. Moreover, the fθ lens 63 transforms the respective light beams L1 and L2 deflected at the equal angular velocity in the main-scanning direction X by the polygonal mirror 42 such that the respective light beams L1 and L2 may move at the equal linear velocity along the main-scanning line on respective photosensitive drums 13. Thus, the respective light beams L1 and L2 are repeatedly scanned on the surface of respective photosensitive drums 13 in the main-scanning direction X.

Immediately before start of main scanning of the respective photosensitive drums 13 with the respective light beams L1 and L2, the light beam L1 at one side is reflected by the BD mirror 71 to enter the BD sensor 72. The BD sensor 72 receives the light beam L1 at timing immediately before the start of main scanning of the respective photosensitive drums 13, and outputs a BD signal indicating timing immediately before the start of the main scanning. According to this BD signal, the timing of starting main scanning of the respective photosensitive drums 13 on which yellow and magenta toner images are formed is determined. Then, modulation of the respective light beams L1 and L2 according to the respective image data with yellow and magenta is started.

On the other hand, the respective photosensitive drums 13 where yellow and magenta toner images are to be formed are rotatably driven. The respective light beams L1 and L2 scan a two-dimensional surface (a circumference surface) of the respective photosensitive drums 13. Thus, respective electrostatic latent images are formed at the surfaces of the respective photosensitive drums 13.

Next, the light beam L3 of the second semiconductor laser 45a transmits the collimator lens 57a and is made to parallel light. The light beam L3 enters and is reflected by the respective mirrors 59a and 59b via the aperture 58, and transmits the cylindrical lens 56 to enter the reflecting surface 42a of the polygonal mirror 42. The light beam L4 of the second semiconductor laser 45b transmits the collimator lens 57b and is made to parallel light. The light beam L4 enters the reflecting surface 42a of the polygonal mirror 42 via the aperture 58, the mirror (semi-transparent mirror) 59b, and the cylindrical lens 56.

On the drive substrate 46 (YZ plane), the respective second semiconductor lasers 45a and 45b are disposed at different positions from one another in the sub-scanning direction Y. However, the light beam L3 of the second semiconductor laser 45a is reflected by the respective mirrors 59a and 59b to be shifted to a second optical path J2 in common with the light beam L4 of the second semiconductor laser 45b in the sub-scanning direction Y. The second optical path J2 is the optical path formed by the second incident optical system 52 from the mirror 59b to the reflecting surface 42a of the polygonal mirror 42 via the cylindrical lens 56. In the second optical path J2, as illustrated in FIG. 4, the respective light beams L3 and L4 overlap with each other and pass through the identical straight line in plan view (in a view along the rotation axis direction of the polygonal mirror 42). That is, the respective light beams L3 and L4 overlap with each other in the height direction Z.

On the drive substrate 46 (the YZ plane), the respective second semiconductor lasers 45a and 45b are disposed at different positions from one another in the height direction Z. However, setting of the emission directions of the light beams L3 and L4 of the respective second semiconductor lasers 45a and 45b or the orientations of respective mirrors 59a and 59b almost superimposes incident spots (second incident spots) of the respective light beams L3 and L4 on the reflecting surface 42a of the polygonal mirror 42. In view of this, in the second optical path J2, the light beams L3 and L4 of the respective second semiconductor lasers 45a and 45b enter from obliquely downward and obliquely upward to the reflecting surface 42a of the polygonal mirror 42. Then, when being reflected by the reflecting surface 42a of the polygonal mirror 42, the respective light beams L3 and L4 are away from one another in the obliquely upward direction and the obliquely downward direction. The light beam L3 at one side is reflected by the reflecting surface 42a of the polygonal mirror 42 to obliquely upward, transmits the fθ lens 65, is sequentially reflected by the three mirrors 66b, 66c, and 66d, and enters the photosensitive drum 13 (not illustrated) where cyan toner image is to be formed. The light beam L4 at the other side is reflected by the reflecting surface 42a of the polygonal mirror 42 to obliquely downward, transmits the fθ lens 65, is reflected by the one mirror 66a, and enters the photosensitive drum 13 (not illustrated) where black toner image is to be formed.

Immediately before start of main scanning of the respective photosensitive drums 13 with the respective light beams L3 and L4, the other light beam L3 is reflected by the BD mirror 74 to enter the BD sensor 75. The BD sensor 75 outputs a BD signal indicating timing immediately before the start of the main scanning of the respective photosensitive drums 13 with the respective light beams L3 and L4. According to this BD signal, the timing of starting main scanning of the respective photosensitive drums 13 where cyan and black toner images are to be formed is determined. Then, modulation of the respective light beams L3 and L4 according to respective cyan and black image data is started.

On the other hand, the respective photosensitive drums 13 where cyan and black toner images are to be formed are rotatably driven. The respective light beams L3 and L4 scan a two-dimensional surface (a circumference surface) of the respective photosensitive drums 13. Thus, respective electrostatic latent images are formed at the surfaces of the respective photosensitive drums 13.

The light scanning device 11 with this constitution includes the polygonal mirror 42 at the approximately center of the bottom plate 41a of the housing 41. The light scanning device 11 includes the respective first semiconductor lasers 44a and 44b and the respective second semiconductor lasers 45a and 45b disposed symmetrically to one another placing the imaginary straight line M passing through the center of the polygonal mirror 42 as the center. Here, the first incident optical system 51 is disposed symmetrically to the second incident optical system 52, and the first image-forming optical system 61 is disposed symmetrically to the second image-forming optical system 62. This allows approximately downsizing the light scanning device 11 viewed from the side by aggregating the polygonal mirror 42, the respective first semiconductor lasers 44a and 44b, the respective second semiconductor lasers 45a and 45b, the first incident optical system 51, the second incident optical system 52, or a similar component in a small space.

The light beams L1 and L2 of the respective first semiconductor lasers 44a and 44b enter the approximately identical first incident spots on the reflecting surface 42a of the polygonal mirror 42. Additionally, the light beams L3 and L4 of the respective second semiconductor lasers 45a and 45b enter the approximately identical second incident spots on the reflecting surface 42a of the polygonal mirror 42. This thins the thickness of the polygonal mirror 42, and the polygonal mirror 42 does not cause an increase in height of the light scanning device 11.

Further, the respective light beams L1 and L2 reflected by the reflecting surface 42a of the polygonal mirror 42 move apart from each other in the obliquely downward direction and the obliquely upward direction. On the other hand, the arranged position of the fθ lens 63 with respect to the polygonal mirror 42 is set such that the respective light beams L1 and L2 enter the fθ lens 63 before the separation distance between the respective light beams L1 and L2 in the up-down direction becomes long. Similarly, the respective light beams L3 and L4 reflected by the reflecting surface 42a of the polygonal mirror 42 move apart from each other in the obliquely downward direction and the obliquely upward direction. On the other hand, the arranged position of the fθ lens 65 with respect to the polygonal mirror 42 is set such that the respective light beams L3 and L4 enter the fθ lens 65 before the separation distance between the respective light beams L3 and L4 in the up-down direction becomes long. This thins the respective thicknesses of the fθ lenses 63 and 65, and the respective fθ lenses 63 and 65 do not cause an increase in height of the light scanning device 11.

The respective mirrors 55a and 55b shift the light beam L2 of the first semiconductor laser 44b to the first optical path J1 near the imaginary straight line M (the center of the device) in the sub-scanning direction Y and then causes the light beam L2 to enter the polygonal mirror 42. Additionally, the respective mirrors 59a and 59b shift the light beam L3 of the second semiconductor laser 45a to the second optical path J2 near the imaginary straight line M (the center of the device) in the sub-scanning direction Y and then causes the light beam L3 to enter the polygonal mirror 42. Accordingly, the diameter of the polygonal mirror 42 can be reduced such that the first image-forming optical system 61 and the second image-forming optical system 62 becomes closer to each other. This reduces the lateral width of the light scanning device 11 so as to downsize the light scanning device 11.

Further, the respective first semiconductor lasers 44a and 44b and the respective second semiconductor lasers 45a and 45b are mounted on the identical drive substrate 46. This ensures a small parts count and simplifies the wiring for the respective semiconductor lasers 44a, 44b, 45a, and 45b.

Figure 10:
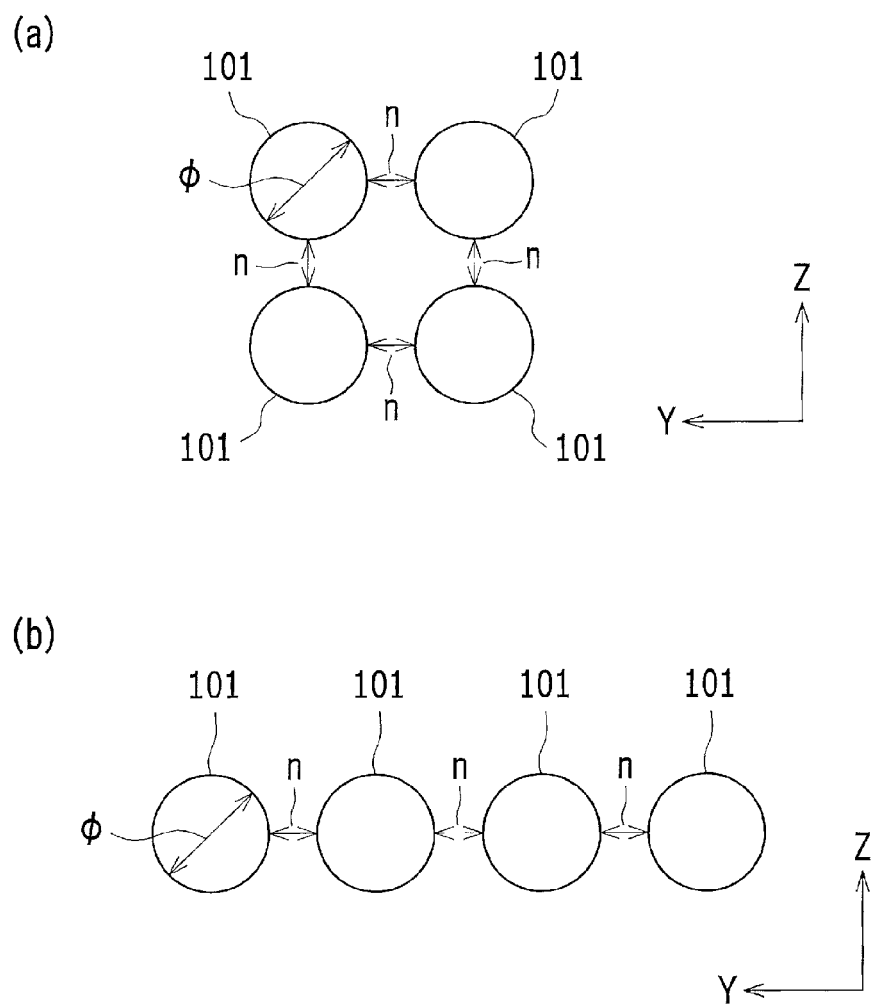
FIGS. 10A and 10B are diagrams illustrating arrangement examples of respective light-emitting elements in a conventional light scanning device.

Now, as illustrated in FIG. 10A, if two light-emitting elements 101 are averaged in the vertical direction, the arrangement space for the respective light-emitting elements 101 in the height direction Z (the vertical direction) becomes wider so as to increase the high of the light scanning device. As illustrated in FIG. 10B, if the four light-emitting elements 101 are arranged in the lateral direction, the arrangement spaces for the respective light-emitting elements 101 in the sub-scanning direction Y (the lateral direction) becomes wider so as to widen the width of the light scanning device. Accordingly, application of any of the arrangements makes it difficult to further downsize the light scanning device.

For example, in FIG. 10A, in the case where outer diameters φ of the respective light-emitting elements 101 are 15 mm and the interval between the respective light-emitting elements 101 is 5 mm, the arrangement space for the respective light-emitting elements 101 in the height direction Z becomes 35 mm. In FIG. 10B, in the case where the outer diameters φ of the respective light-emitting elements 101 are 15 mm and the interval between the respective light-emitting elements 101 is 5 mm, the arrangement space for the respective light-emitting elements 101 in the sub-scanning direction Y becomes 75 mm.

Therefore, in the light scanning device 11 according to the first embodiment, on the drive substrate 46 (YZ plane), the respective first semiconductor lasers 44a and 44b and the respective second semiconductor lasers 45a and 45b are arranged at respective corners in an isosceles trapezoid. This narrows both: the arrangement space in the vertical direction (the vertical direction parallel to the rotation axis direction of the polygonal mirror 42 in the YZ plane); and the arrangement space in the lateral direction (the lateral direction perpendicular to the rotation axis direction of the polygonal mirror 42 in the YZ plane), for the respective semiconductor lasers 44a, 44b, 45a, and 45b.

Figure 6:
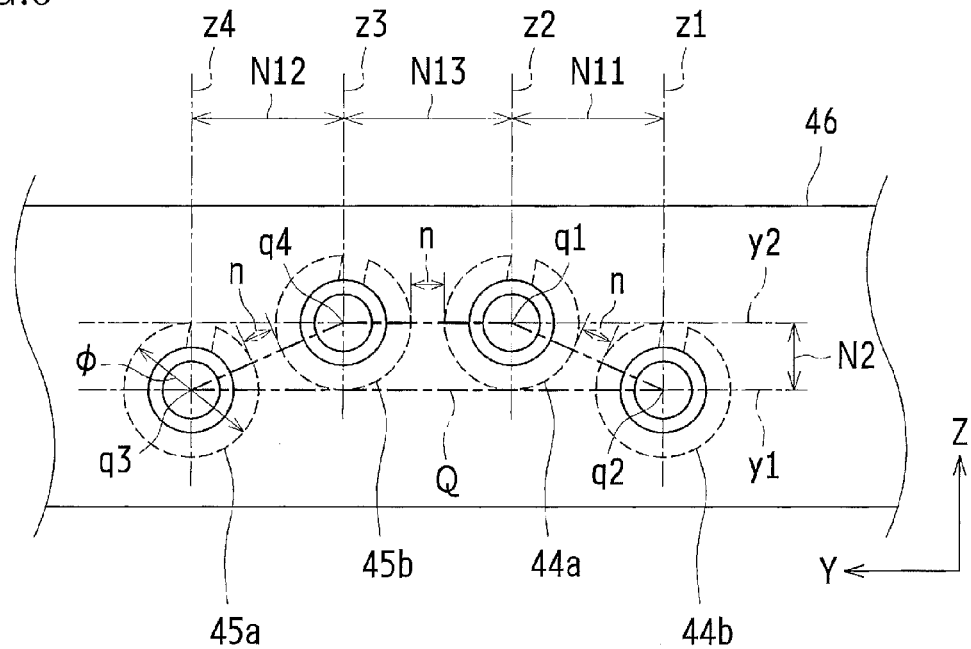
FIG. 6 is a diagram illustrating an arrangement of respective first semiconductor lasers in a view along a main-scanning direction from the side of a polygonal mirror in the light scanning device according to the first embodiment.

The following describes that arrangement of the respective first semiconductor lasers 44a and 44b and the respective second semiconductor lasers 45a and 45b in detail. FIG. 6 is a diagram illustrating the arrangement of the respective first semiconductor lasers 44a and 44b and the respective second semiconductor lasers 45a and 45b in a view along the main-scanning direction X from the side of the polygonal mirror 42.

As apparent from FIG. 6, the respective first semiconductor lasers 44a and 44b and the respective second semiconductor lasers 45a and 45b are arranged at corners q1 to q4 of an isosceles trapezoid Q illustrated with an alternate long and short dash line. The first semiconductor laser 44b and the second semiconductor laser 45a, both of which are disposed outside, are arranged on a lower lateral line y1 (the line overlapped with the lower base of the isosceles trapezoid) along the sub-scanning direction Y (the lateral direction). The first semiconductor laser 44a and the second semiconductor laser 45b, which are disposed inside, are arranged on an upper lateral line y2 (the line overlapped with the upper base of the isosceles trapezoid) along the sub-scanning direction Y. Further, the respective first semiconductor lasers 44a and 44b and the respective second semiconductor lasers 45a and 45b are arranged on respective vertical lines z1, z2, z3, and z4, which are different from one another, extending in the height direction Z (the vertical direction).

A pitch N11 between the respective vertical lines z1 and z2, a pitch N12 between the respective vertical lines z3 and z4, and a pitch N13 between the respective vertical lines z2 and z3 are wider than the outer diameters φ of the respective first semiconductor lasers 44a and 44b and the respective second semiconductor lasers 45a and 45b. The pitch N11 between the respective vertical lines z1 and z2 is identical to the pitch N12 of the respective vertical lines z3 and z4, and the pitches N11 and N12 are slightly narrower than the pitch N13 between the respective vertical lines z2 and z3. This is because an interval n between the first semiconductor laser 44b and the second semiconductor laser 45a is set to be on the upper lateral line y2 while an interval n between the respective first semiconductor lasers 44a and 44b and an interval n between the respective second semiconductor lasers 45a and 45b are set to be along the direction oblique to the upper lateral line y2.

A pitch N2 between the lower lateral line y1 and the upper lateral line y2 are narrower than the outer diameters φ of the respective first semiconductor lasers 44a and 44b and the respective second semiconductor lasers 45a and 45b, so as to be narrower than the pitches N11, N12, and N13 between the respective vertical lines z1 to z4. This is because the wider pitches N11, N12, and N13 between the respective vertical lines z1 to z4 than the outer diameters φ allows maintaining the intervals n between the respective first semiconductor lasers 44a and 44b and the respective second semiconductor lasers 45a and 45b even when the pitch N2 between the lower lateral line y1 and the upper lateral line y2 are narrower than the outer diameters φ.

Here, for example, when the outer diameters φ of the respective first semiconductor lasers 44a and 44b and the respective second semiconductor lasers 45a and 45b are 15 mm and the intervals n are 5 mm, the pitch N13 between the respective vertical lines z2 and z3 becomes approximately 20 mm. The pitch N11 between the respective vertical lines z1 and z2 and the pitch N12 between the respective vertical lines z3 and z4 can be reduced to 18 mm, so as to reduce the arrangement space for the respective first semiconductor lasers 44a and 44b and the respective second semiconductor lasers 45a and 45b in the sub-scanning direction Y (the lateral direction) to 71 mm. Further, the pitch N2 between the lower lateral line y1 and the upper lateral line y2 can be reduced to 8 mm, so as to reduce the arrangement space for the respective first semiconductor lasers 44a and 44b and the respective second semiconductor lasers 45a and 45b in the height direction Z to 22 mm.

Accordingly, the arrangement space for the respective first semiconductor lasers 44a and 44b and the respective second semiconductor lasers 45a and 45b in the height direction Z is −13 mm compared with the arrangement space for the respective light-emitting elements 101 in FIG. 10A. The arrangement space for the respective first semiconductor lasers 44a and 44b and the respective second semiconductor lasers 45a and 45b in the sub-scanning direction Y is −4 mm compared with the arrangement space for the respective light-emitting elements 101 in FIG. 10B.

Accordingly, the light scanning device 11 according to the first embodiment can be reduced in lateral width by 4 mm and in height by 13 mm.

As just described, in the light scanning device 11 according to the first embodiment, on the drive substrate 46 (YZ plane), the respective first semiconductor lasers 44a and 44b and the respective second semiconductor lasers 45a and 45b are arranged at the four corners q1 to q4 of the isosceles trapezoid Q. This maintains the interval n between the respective first semiconductor lasers 44a and 44b and the interval n between the respective second semiconductor lasers 45a and 45b, and also reduces the arrangement space for the respective first semiconductor lasers 44a and 44b and the respective second semiconductor lasers 45a and 45b both in the sub-scanning direction Y (the lateral direction) and the height direction Z (the vertical direction), so as to reduce the lateral width and the height of the light scanning device 11.

Figure 7:
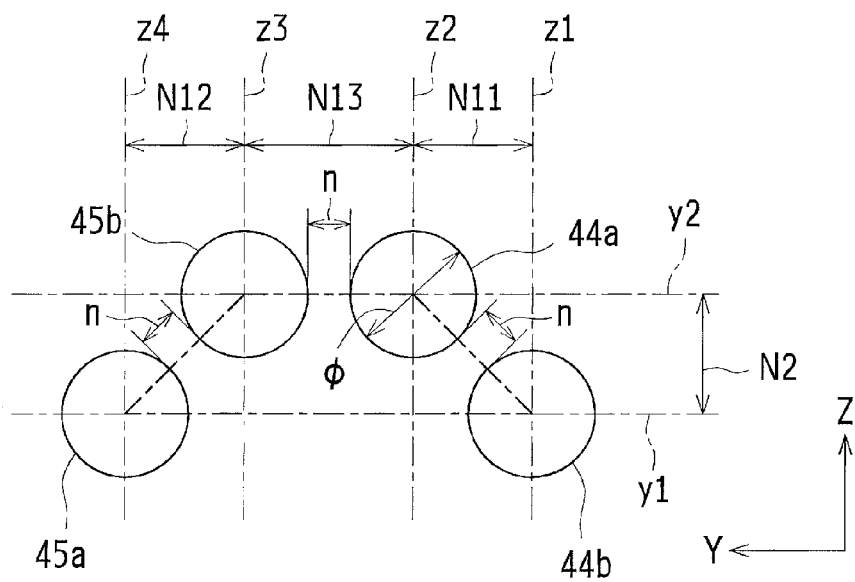
FIG. 7 is a diagram illustrating another arrangement of the respective first semiconductor lasers in a view along the main-scanning direction from the side of the polygonal mirror.

Here, as illustrated in FIG. 7, the pitch N11 between the respective vertical lines z1 and z2, the pitch N12 between the respective vertical lines z3 and z4, and the pitch N2 between the lower lateral line y1 and the upper lateral line y2 may be set to be identical to one another (N11=N12=N2). In this case, when the outer diameters φ of the respective first semiconductor lasers 44a and 44b and the respective second semiconductor lasers 45a and 45b are 15 mm and the intervals n are 5 mm, the respective pitches N11 and N12 become approximately 14 mm and the arrangement space for the respective first semiconductor lasers 44a and 44b and the respective second semiconductor lasers 45a and 45b in the sub-scanning direction Y (the lateral direction) becomes 63 mm. Accordingly, the pitch N2 between the lower lateral line y1 and the upper lateral line y2 becomes 14 mm, and the arrangement space for the respective first semiconductor lasers 44a and 44b and the respective second semiconductor lasers 45a and 45b in the height direction Z becomes 29 mm. Further, the pitches N11 and N12 may be shorter than the pitch N2.

While in the first embodiment the respective first semiconductor lasers 44a and 44b and the respective second semiconductor lasers 45a and 45b are arranged at the respective corners of the isosceles trapezoid, similar operation and effect can be provided by arrangement at respective corners of an inverted isosceles trapezoid.

The following describes a light scanning device according to a second embodiment. The light scanning device according to the second embodiment differs from the device according to the first embodiment in arrangement for the respective first semiconductor lasers 44a and 44b and the respective second semiconductor lasers 45a and 45b in a view along the main-scanning direction X from the side of the polygonal mirror 42. However, the polygonal mirror 42, the first incident optical system 51 and the second incident optical system 52, and the first image-forming optical system 61 and second image-forming optical system 62 are similar to those in the device 11 according to the first embodiment.

Figure 8:
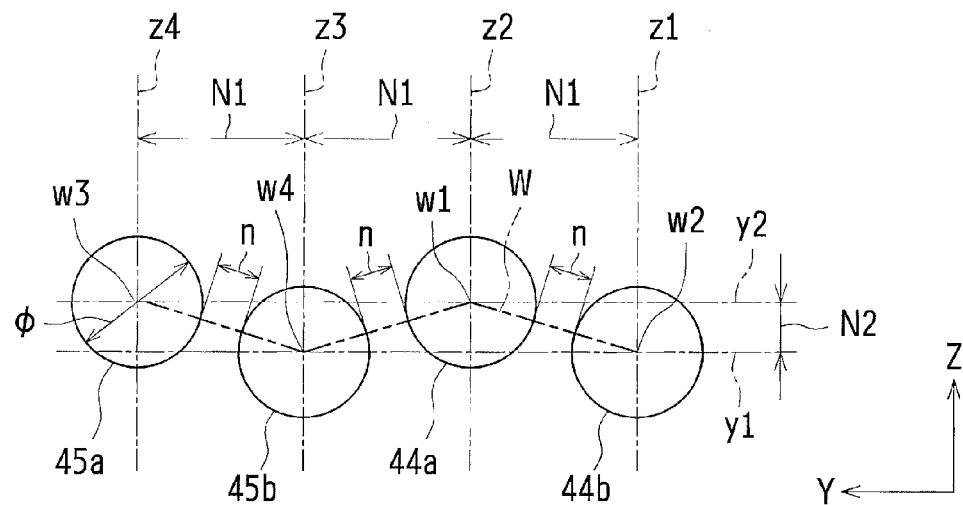
FIG. 8 is a diagram illustrating an arrangement of respective first semiconductor lasers in a view along a main-scanning direction from the side of a polygonal mirror in a light scanning device according to a second embodiment.

FIG. 8 is a diagram illustrating the respective first semiconductor lasers 44a and 44b and the respective second semiconductor lasers 45a and 45b in the light scanning device according to the second embodiment in a view along the main-scanning direction X from the side of the polygonal mirror 42. Here, the respective first semiconductor lasers 44a and 44b and the respective second semiconductor lasers 45a and 45b are disposed on an approximately the same plane (YZ plane) by being mounted on the plane plate-shaped printed circuit board. The first semiconductor lasers 44a and 44b and the second semiconductor lasers 45a and 45b emit light beams L1 to L4, respectively. The respective light beams L1 to L4 are emitted in the vertical direction (the main-scanning direction X) with respect to the plane and to the inside of the housing 41.

As apparent from FIG. 8, the respective first semiconductor lasers 44a and 44b and the respective second semiconductor lasers 45a and 45b are arranged at corners w1 to w4 of a saw-tooth shape W illustrated with an alternate long and short dash line. The first semiconductor laser 44b and the second semiconductor laser 45b are arranged on the lower lateral line y1 along the sub-scanning direction Y (the lateral direction perpendicular to the rotation axis direction of the polygonal mirror 42 in the YZ plane). The first semiconductor laser 44a and the second semiconductor laser 45a are arranged on the upper lateral line y2 in the sub-scanning direction Y. Further, the respective first semiconductor lasers 44a and 44b and the respective second semiconductor lasers 45a and 45b are arranged on the respective vertical lines z1, z2, z3, and z4, which are different from one another, extending in the height direction Z (the vertical direction parallel to the rotation axis direction of the polygonal mirror 42 in the YZ plane).

Pitches N1 between the respective vertical lines z1 to z4 are identical to one another, and are wider than the outer diameters φ of the respective first semiconductor lasers 44a and 44b and the respective second semiconductor lasers 45a and 45b.

The pitch N2 between the lower lateral line y1 and the upper lateral line y2 is narrower than the outer diameters φ of the respective first semiconductor lasers 44a and 44b and the respective second semiconductor lasers 45a and 45b, so as to be narrower than the pitches N1 between the respective vertical lines z1 to z4. This is because the wider pitches N1 between the respective vertical lines z1 to z4 than the outer diameters φ allows maintaining the intervals n between the respective first semiconductor lasers 44a and 44b and the respective second semiconductor lasers 45a and 45b even when the pitch N2 between the lower lateral line y1 and the upper lateral line y2 are narrower than the outer diameters φ.

Here, for example, when the outer diameters φ of the respective first semiconductor lasers 44a and 44b and the respective second semiconductor lasers 45a and 45b are 15 mm and the intervals n are 5 mm, the pitch N1 between the respective vertical lines z2 and z3 can be reduced to 18 mm, so as to reduce the arrangement space for the respective first semiconductor lasers 44a and 44b and the respective second semiconductor lasers 45a and 45b in the sub-scanning direction Y (the lateral direction) to 69 mm. Additionally, the pitch N2 between the lower lateral line y1 and the upper lateral line y2 can be reduced to 8 mm, so as to reduce the arrangement space for the respective first semiconductor lasers 44a and 44b and the respective second semiconductor lasers 45a and 45b in the height direction Z (the vertical direction) to 22 mm.

Accordingly, the arrangement space for the respective first semiconductor lasers 44a and 44b and the respective second semiconductor lasers 45a and 45b in the height direction Z is −13 mm compared with the arrangement space for the respective light-emitting elements 101 in FIG. 10A. The arrangement space for the respective first semiconductor lasers 44a and 44b and the respective second semiconductor lasers 45a and 45b in the sub-scanning direction Y is −6 mm compared with the arrangement space for the respective light-emitting elements 101 in FIG. 10B.

Accordingly, the light scanning device 11 according to the second embodiment can be reduced in lateral width by 6 mm and in height by 13 mm.

Figure 9:
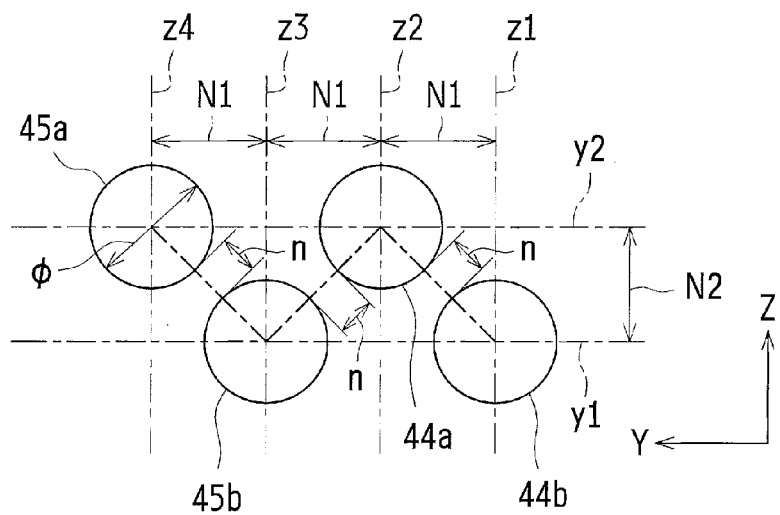
FIG. 9 is a diagram illustrating another arrangement of the respective first semiconductor lasers in a view along the main-scanning direction from the side of the polygonal mirror.

Here, as illustrated in FIG. 9, the pitches N1 between the respective vertical lines z1 to z4 and the pitch N2 between the lower lateral line y1 and the upper lateral line y2 may be set to be identical to one another. In this case, when the outer diameters φ of the respective first semiconductor lasers 44a and 44b and the respective second semiconductor lasers 45a and 45b are 15 mm and the intervals n are 5 mm, the respective pitches N1 and N2 become approximately 14 mm and the arrangement space for the respective first semiconductor lasers 44a and 44b and the respective second semiconductor lasers 45a and 45b in the sub-scanning direction Y (the lateral direction) becomes 57 mm. Accordingly, the pitch N2 between the lower lateral line y1 and the upper lateral line y2 becomes 14 mm, and the arrangement space for the respective first semiconductor lasers 44a and 44b and the respective second semiconductor lasers 45a and 45b in the height direction Z becomes 29 mm. Further, the pitches N1 may be shorter than the pitch N2.

While in the second embodiment the respective first semiconductor lasers 44a and 44b and the respective second semiconductor lasers 45a and 45b are arranged at the respective corners of the saw-tooth shape, similar operation and effect can be provided by arrangement at respective corners of an inverted saw-tooth shape.

The preferred embodiment according to the present invention is described above with reference to the attached drawings; however, it is needless to say that the present invention is not limited to the above examples. It would be obvious that an ordinary skilled person conceives various modifications and corrections within scopes defined in the claims, and it should be understood that those modified examples fall within the technical scope of the present invention.

INDUSTRIAL APPLICABILITY

The present invention is appropriate for a light scanning device that includes: a plurality of light-emitting elements that emits respective light beams; a deflecting section that deflects respective light beams; and respective reflective mirrors that reflect respective light beams, and that scan respective scan objects with respective light beams, and is appropriate for an image forming apparatus with the light scanning device.

This application is based on and claims priority to Japanese Patent Application 2012-230109, filed in Japan on Oct. 17, 2012, the entire contents of which are incorporated herein by reference.

DESCRIPTION OF REFERENCE SIGNS 1 image forming apparatus
11 light scanning device
12 development apparatus
13 photosensitive drum (scan object)
14 drum cleaning apparatus
15 charging unit
17 fixing apparatus
21 intermediate transfer belt
22 belt cleaning apparatus
23 secondary transfer apparatus
33 pickup roller
34 registration roller
35 conveyance roller
36 discharge roller
41 housing
42 polygonal mirror (deflecting section)
43 polygonal motor
44a, 44b first semiconductor laser (first light-emitting element)
45a, 45b second semiconductor laser (second light-emitting element)
46 drive substrate
51 first incident optical system
52 second incident optical system
53a, 53b, 57a, 57b collimator lens
55a, 55b, 59a, 59b mirror
56 cylindrical lens
61 first image-forming optical system
62 second image-forming optical system
63, 65 fθ lens
64a to 64d, 66a to 66d mirror
71, 74 BD mirror
72, 75 BD sensor
73, 76 substrate

The invention claimed is:

1. A light scanning device, comprising:
a plurality of first light-emitting elements and a plurality of second light-emitting elements;
a deflecting section configured to deflect respective light beams emitted from the respective first light-emitting elements and the respective second light-emitting elements;
a first image-forming optical system configured to guide the respective light beams emitted from the respective first light-emitting elements and deflected by the deflecting section, to respective scan objects; and
a second image-forming optical system configured to guide the respective light beams emitted from the respective second light-emitting elements and deflected by the deflecting section, to respective scan objects, wherein
the respective first light-emitting elements and the first image-forming optical system, and the respective second light-emitting elements and the second image-forming optical system are divided to both sides of a straight line passing through a rotation axis of the deflecting section,
the light scanning device further comprises:
a first incident optical system configured to guide the light beams of the respective first light-emitting elements to a first incident spot of the deflecting section through an identical line in a view along a rotation axis direction of the deflecting section; and
a second incident optical system configured to guide the light beams of the respective second light-emitting elements to a second incident spot of the deflecting section through another identical line in a view along the rotation axis direction of the deflecting section,
the respective first light-emitting elements and the respective second light-emitting elements are arranged on an identical plane on a housing of the light scanning device such that emission directions of the light beams of the respective first light-emitting elements and the respective second light-emitting elements are perpendicular to the plane,
on the plane, the respective first light-emitting elements and the respective second light-emitting elements are divided to two mutually different lines in a lateral direction perpendicular to the rotation axis of the deflecting section, and all of the respective first light-emitting elements and the respective second light-emitting elements are arranged on different lines in a vertical direction corresponding to the rotation axis direction of the deflecting section, and
a line pitch in the vertical direction between the two mutually different lines in the lateral direction is narrower than respective outer diameters of the first light-emitting elements and the second light-emitting elements.

2. The light scanning device according to claim 1, wherein the line pitch in the vertical direction is equal to or shorter than a line pitch in the lateral direction.

3. The light scanning device according to claim 1, wherein the respective first light-emitting elements and the respective second light-emitting elements are arranged at respective corners of a trapezoidal on the plane.

4. The light scanning device according to claim 1, wherein the respective first light-emitting elements and the respective second light-emitting elements are arranged at respective corners of a saw-tooth shape on the plane.

5. An image forming apparatus, comprising
the light scanning device according to claim 1, wherein
the image forming apparatus forms a latent image on a scan object by the light scanning device, develops the latent image on the scan object as a visible image, and transfers and forms the visible image from the scan object to a paper sheet.

* * * * *